US011703700B2

(12) United States Patent
Jung (10) Patent No.: US 11,703,700 B2
(45) Date of Patent: Jul. 18, 2023

(54) LASER IRRADIATION APPARATUS, DRIVING METHOD THEREOF, AND METHOD OF MANUFACTURING DISPLAY DEVICE USING THE SAME

(71) Applicant: SAMSUNG DISPLAY CO., LTD., Yongin-si (KR)

(72) Inventor: Wook Yeon Jung, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 880 days.

(21) Appl. No.: 16/568,841

(22) Filed: Sep. 12, 2019

(65) Prior Publication Data

US 2020/0103681 A1 Apr. 2, 2020

(30) Foreign Application Priority Data

Oct. 1, 2018 (KR) .................. 10-2018-0117114

(51) Int. Cl.
| | |
|---|---|
| G02F 1/13 | (2006.01) |
| B23K 26/066 | (2014.01) |
| B23K 26/062 | (2014.01) |
| B23K 26/03 | (2006.01) |
| B23K 26/18 | (2006.01) |

(52) U.S. Cl.
CPC .......... *G02F 1/1303* (2013.01); *B23K 26/032* (2013.01); *B23K 26/062* (2015.10); *B23K 26/066* (2015.10); *B23K 26/18* (2013.01)

(58) Field of Classification Search
CPC ... G02F 1/1303; B23K 26/062; B23K 26/066; B23K 26/032; B23K 26/18
See application file for complete search history.

(56) References Cited

U.S. PATENT DOCUMENTS

| 6,965,120 B1 * | 11/2005 | Beyerer ............. G01N 21/8806 |
| | | 382/141 |
| 8,979,986 B2 | 3/2015 | Painter et al. |
| 10,417,995 B2 * | 9/2019 | Xu ............................. G09G 5/10 |
| 2011/0079350 A1 | 4/2011 | Lee et al. |

FOREIGN PATENT DOCUMENTS

| JP | 2002001555 A | 1/2002 |
| JP | 2012055923 A | 3/2012 |
| KR | 1020110037105 A | 4/2011 |

OTHER PUBLICATIONS

Ralph Delmdahl et al., Laser lift-off systems for flexible-display production, Article, 2014, 5pages, vol. 15, No. 1, Journal of Information Display.

* cited by examiner

*Primary Examiner* — Georgia Y Epps
*Assistant Examiner* — Don J Williams
(74) *Attorney, Agent, or Firm* — Cantor Colburn LLP (57) ABSTRACT

A laser irradiation apparatus includes a stage on which a substrate is provided, a laser irradiation unit which irradiates a laser to the substrate on the stage, an image acquiring unit which acquires an image of a predetermined region of the substrate, and a control unit electrically connected to the laser irradiation unit and the image acquiring unit, where the control unit calculates a brightness value corresponding to an average value of grayscale values of the image provided from the image acquiring unit, compares a calculated brightness value with a reference brightness value, and outputs data on performance of the laser based on a result of comparing the calculated brightness value with the reference brightness value.

13 Claims, 6 Drawing Sheets

LASER IRRADIATION APPARATUS, DRIVING METHOD THEREOF, AND METHOD OF MANUFACTURING DISPLAY DEVICE USING THE SAME

This application claims priority to Korean Patent Application No. 10-2018-0117114, filed Oct. 1, 2018, and all the benefits accruing therefrom under 35 U.S.C. § 119, the content of which in its entirety is herein incorporated by reference.

BACKGROUND

1. Field

Exemplary embodiments of the disclosure relate to a laser irradiation apparatus, a driving method thereof, and a method of manufacturing a display device using the laser irradiation apparatus, and more particularly to a laser irradiation apparatus capable of monitoring the performance of a laser in real time, a driving method thereof, and a method of manufacturing a display device using the laser irradiation apparatus.

2. Description of Related Art

Generally, a laser irradiation apparatus may be used for manufacturing a semiconductor device or a display device. For example, in a structure in which a display unit between two glass substrates is sealed with a frit, the frit may be melted and bonded to the glass substrates using a laser. In addition, a laser may be used for cutting a semiconductor wafer or a glass substrate, separating two thin films or substrates from each other, or patterning a predetermined thin film.

SUMMARY

When manufacturing a semiconductor device or a display device using a laser irradiation apparatus, energy density or intensity of the laser may be changed or controlled by repeated use. Therefore, it is desired to keep the laser performance uniform to reduce defects and to improve the reliability of the products.

One or more exemplary embodiments provide a laser irradiation apparatus capable of monitoring the performance of a laser in real time, a driving method thereof, and a method of manufacturing a display device using the laser irradiation apparatus.

One or more exemplary embodiments also provide a laser irradiation apparatus capable of real-time detection of defects due to deterioration of the performance of a laser to prevent additional defects from occurring, a driving method thereof, and a method of manufacturing a display device using the laser irradiation apparatus.

According to an exemplary embodiment, a laser irradiation apparatus includes a stage on which a substrate is provided; a laser irradiation unit which irradiates a laser to the substrate on the stage; an image acquiring unit which acquires an image of a predetermined region of the substrate; and a control unit electrically connected to the laser irradiation unit and the image acquiring unit, wherein the control unit may calculate a brightness value corresponding to an average value of grayscale values of the image provided from the image acquiring unit, compare a calculated brightness value with a reference brightness value, and output data on performance of the laser obtained based on a result of comparing the calculated brightness value with the reference brightness value.

In an exemplary embodiment, the image acquiring unit may include at least one of a charge-coupled device ("CCD") and a complementary metal-oxide semiconductor ("CMOS").

In an exemplary embodiment, the reference brightness value may be calculated from grayscale values of an image acquired by the image acquiring unit before irradiating the laser to the substrate, and the image for calculating the reference brightness value may be acquired in the predetermined region of the substrate.

In an exemplary embodiment, the calculated brightness value may be calculated from the grayscale values of the image acquired by the image acquiring unit after irradiating the laser to the substrate.

In an exemplary embodiment, the predetermined region of the substrate may include one of an alignment mark and an identification mark.

According to another exemplary embodiment, a driving method of the laser irradiation apparatus includes: providing a substrate on a stage of the laser irradiation apparatus; acquiring a first image in a first region of the substrate; calculating a first brightness value corresponding to an average value of grayscale values of the first image; irradiating a laser to a second region of the substrate including the first region; acquiring a second image in the first region of the substrate; calculating a second brightness value corresponding to an average value of grayscale values of the second image; and comparing the second brightness value with the first brightness value and outputting data on performance of the laser obtained based on a result of the comparing.

In an exemplary embodiment, the driving method may further include: comparing the first brightness value with a reference value after calculating the first brightness value, and unloading the substrate from the stage when the first brightness value is less than the reference value.

In an exemplary embodiment, the first region of the substrate may include one of an alignment mark and an identification mark.

According to another exemplary embodiment, a driving method of the laser irradiation apparatus includes: providing a substrate on a stage of the laser irradiation apparatus; acquiring a first image of a first region of the substrate; calculating a first brightness value corresponding to an average value of grayscale values of the first image; irradiating a laser to a second region of the substrate including the first region; irradiating a laser to a third region of the substrate adjacent to the second region; acquiring a second image of the second region of the substrate; calculating a second brightness value corresponding to an average value of grayscale values of the second image; acquiring a third image of the first region of the substrate; calculating a third brightness value corresponding to an average value of grayscale values of the third image; and comparing each of the second brightness value and the third brightness value with the first brightness value and outputting data on performance of the laser obtained based on a result of the comparing.

In an exemplary embodiment, the first region of the substrate may include an alignment mark.

In an exemplary embodiment, the second image may be acquired in the second region of the substrate including an identification mark.

According to another exemplary embodiment, a method of manufacturing a display device using a laser irradiation apparatus includes: providing a first thin film on a supporting substrate; providing an element layer on the first thin film; providing a second thin film on the element layer; and separating the supporting substrate from the first thin film, where the separating the supporting substrate includes: acquiring a first image in a first region of the supporting substrate; calculating a first brightness value corresponding to an average value of grayscale values of the first image; irradiating a laser to a second region of the supporting substrate including the first region; acquiring a second image in the first region of the supporting substrate; calculating a second brightness value corresponding to an average value of grayscale values of the second image; and comparing the second brightness value with the first brightness value and outputting data on performance of the laser obtained based on a result of the comparing.

In an exemplary embodiment, the first region of the supporting substrate may include one of an alignment mark and an identification mark.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

It will be understood that when an element is referred to as being "on" another element, it can be directly on the other element or intervening elements may be present therebetween. In contrast, when an element is referred to as being "directly on" another element, there are no intervening elements present. Also, when a layer, a region, an element, or the like is referred to as being "connected" in the embodiment, it will be understood that when a layer, a region, or an element is directly connected as well as layers, regions, or elements are indirectly connected to each other. For example, when a layer, a region, an element, or the like is electrically connected, not only when a layer, a region, an element, or the like is directly connected each other, as well as a case where another layer, region, element, or the like is interposed therebetween and indirectly connected thereto.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." "At least one of A and B" means "A and/or B." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

The sizes of the elements shown in the drawings may be exaggerated or reduced for convenience of explanation. For example, the size and thickness of each element are arbitrarily shown for convenience of explanation, and thus the invention is not necessarily limited to those shown in the drawings.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the invention will be described in detail with reference to the accompanying drawings.

Figure 1:
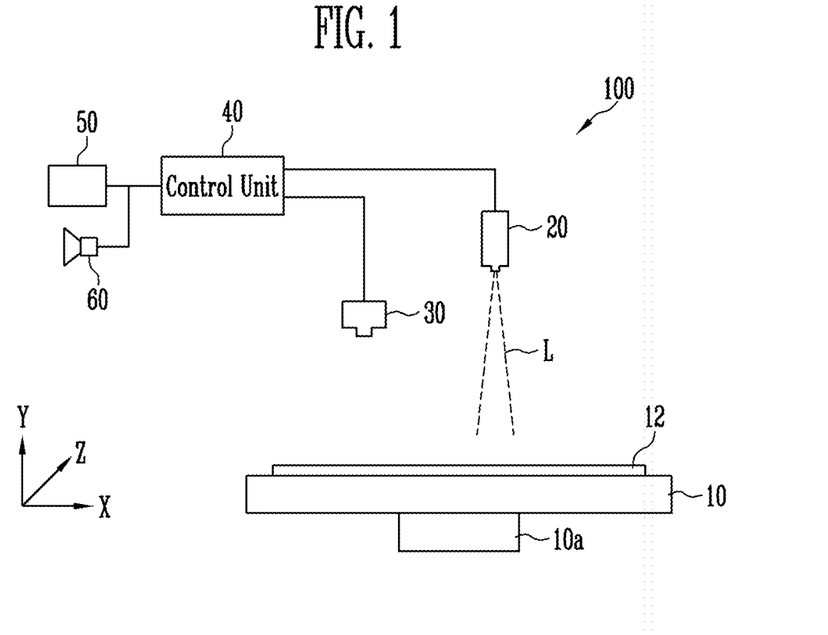
FIG. 1 is a schematic block diagram showing a laser irradiation apparatus according to an embodiment of the invention.

FIG. 1 is a schematic block diagram showing a laser irradiation apparatus according to an embodiment of the invention.

Referring to FIG. 1, an embodiment of a laser irradiation apparatus 100 may include a stage 10, a laser irradiation unit 20, an image acquiring unit 30, and a control unit 40. In such an embodiment, the laser irradiation apparatus 100 may further include a display unit 50 and/or an alarm 60.

The stage 10 may be in the form of a plate having a flat surface. The stage 10 may be moved, for example, in X, Y and Z axis directions by a driving means 10a. A substrate 12 as a process object may be provided on the stage 10.

The laser irradiation unit 20 may be disposed above the stage 10 to irradiate a laser L to the substrate 12.

The laser L may be an excimer laser or a solid state laser.

Although not shown in FIG. 1, in such an embodiment, the laser irradiation unit 20 may be configured to be movable, for example, in the X, Y, and Z axis directions by a predetermined driving means. In an embodiment, the laser irradiation unit 20 may further include a power source and a laser generation unit.

The image acquiring unit 30 may be disposed above the stage 10 to acquire an image of a predetermined region of the substrate 12.

Although not shown in FIG. 1, in an embodiment, the image acquiring unit 30 may be configured to be movable, for example, in the X, Y, and Z axis directions by a predetermined driving means.

The image acquiring unit 30 may be a camera including an image sensing device for acquiring an image. The image sensing device may include, for example, a charge-coupled device ("CCD") or a complementary metal-oxide semiconductor ("CMOS").

Although a single image acquiring unit 30 is shown in FIG. 1, in an alternative embodiment, a plurality of image acquiring units 30 may be provided as desired.

The control unit 40 may be electrically connected to the laser irradiation unit 20 and the image acquiring unit 30. The control unit 40 may be a computer including a central processing unit ("CPU"), a memory, a signal input/output device, and the like.

The control unit 40 may calculate a brightness value corresponding to an average value of grayscale values of the image provided from the image acquiring unit 30 and compare the calculated brightness value with a reference brightness value to obtain data on the performance of the laser L. The control unit 40 may output the data through the display unit 50 and/or the alarm 60.

Figure 2:
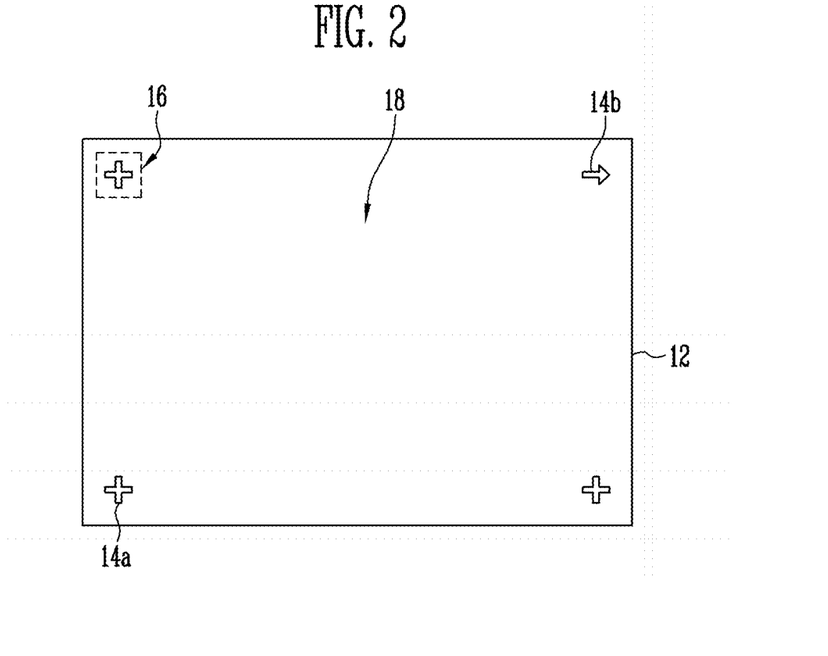
FIG. 2 is a plan view showing an exemplary embodiment of a substrate shown in FIG. 1.

FIG. 2 is a plan view showing an exemplary embodiment of the substrate 12 shown in FIG. 1.

FIG. 2 illustrates an exemplary embodiment in which the substrate 12 is in a rectangular shape. In an alternative exemplary embodiment, the substrate 12 may have one of various planar shapes such as a polygonal shape, a circular shape, and an elliptical shape. In such an embodiment, the substrate 12 may include one or more thin films stacked on a base substrate. The thin film may include an insulating film and a conductive film.

Referring to FIG. 2, in an exemplary embodiment, the substrate 12 may have a rectangular shape and may include, for example, an alignment mark 14*a*, an identification mark 14*b*, or the like at a peripheral portion or an edge portion thereof.

The alignment mark 14*a* may be used to sense the position of the substrate 12. In one exemplary embodiment, for example, the alignment mark 14*a* may be used for alignment of the substrate 12 and the stage 10 or alignment of the substrate 12 and a mask.

The identification mark 14*b* may be used to sense the direction of the substrate 12. In one exemplary embodiment, for example, the identification mark 14*b* may display a front surface of the substrate 12 or a direction of the substrate 12.

Reference numeral 16 denotes a first region corresponding to a partial region of the substrate 12 including the alignment mark 14*a* or the identification mark 14*b*, and reference numeral 18 denotes a second region corresponding to an entire region of the substrate 12 including the first region.

The configuration of the laser irradiation apparatus 100 will hereinafter be described in greater detail with reference to FIG. 3.

Figure 3:
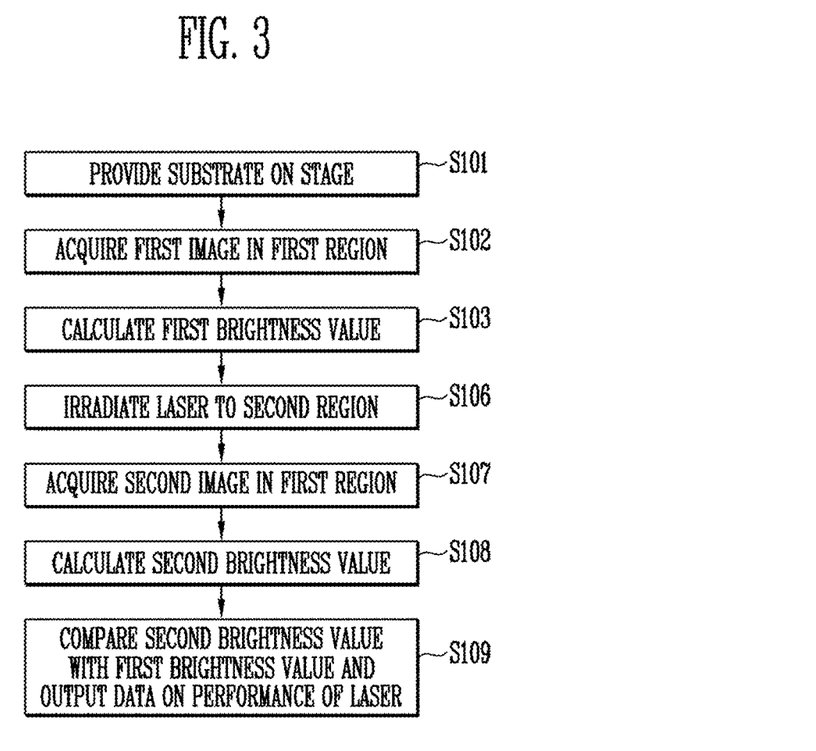
FIG. 3 is a flowchart showing a driving method of the laser irradiation apparatus according to an embodiment of the invention.

FIG. 3 is a flowchart showing a driving method of the laser irradiation apparatus 100 according to an embodiment of the invention.

First, the substrate 12 may be provided on the stage 10 (S101).

The substrate 12 may be loaded on the stage 10 by, for example, a robot arm or an operator.

The image acquiring unit 30 may move to be above the first region 16 of the substrate 12 and photograph the first region 16 of the substrate 12 to acquire a first image (S102). The image acquiring unit 30 may provide the first image to the control unit 40.

In such an embodiment, the image acquiring unit 30 may photograph the alignment mark 14*a* and the identification mark 14*b* of the substrate 12 and provide acquired images to the control unit 40 to check an alignment state of the substrate 12 before acquiring the first image.

In such an embodiment, a single image acquiring unit 30 may be used, but not being limited thereto. Alternatively, a plurality of image acquiring units 30 may be provided as desired. In one exemplary embodiment, for example, two image acquiring units 30 may photograph the alignment marks 14*a* on both sides of the substrate 12, respectively, or acquire first images for the first regions 16 of the substrate 12, respectively.

The control unit 40 may calculate an average value of grayscale values of the first image provided from the image acquiring unit 30 and calculate a first brightness value corresponding to the average value (S103).

The first image may include grayscale values obtained by pixels corresponding to the first region 16 of the substrate 12. Each grayscale value may be, for example, one of values between 0 and 255.

The first brightness value may correspond to the grayscale values between 0 and 255, and may have a value, for example, between 0 and 10. In such an embodiment, the first brightness value may correspond to one of the values obtained by dividing the grayscale values from 0 to 255 into eleven levels.

In an embodiment, the grayscale value is described as a value in a range between 0 and 255 and the first brightness value is described as a value in eleven levels. However, when the range of the grayscale value and the number of levels of the first brightness value are further increased, inspection may be performed more precisely and accurately.

The laser irradiation unit 20 may irradiate the laser L to the second region 18 of the substrate 12 including the first region 16 in a state where the image acquiring unit 30 returns to the original position (S106).

The laser L may have a predetermined energy density or intensity depending on the purpose of the process, and may be irradiated with a predetermined width.

In one exemplary embodiment, For example, the laser irradiation unit 20 may move from one end of the substrate 12 to an opposing end of the substrate 12 at a constant speed or divide the substrate 12 into a plurality of regions and irradiate the laser L in such a manner that the plurality of regions are sequentially scanned.

Melted marks or carbonized marks may remain on the substrate 12 or the thin film to which the laser L is irradiated.

The image acquiring unit 30 may move to be above the first region 16 of the substrate 12 again and photograph the first region 16 of the substrate 12 to acquire a second image (S107). The image acquiring unit 30 may provide the second image to the control unit 40.

The control unit 40 may calculate an average value of grayscale values of the second image provided from the image acquiring unit 30 and calculate a second brightness value corresponding to the average value (S108). The process of calculating the second brightness value may be the same as the process of calculating the first brightness value.

The control unit 40 may compare the second brightness value with the first brightness value and output data on the performance of the laser L through the display unit 50 and/or the alarm 60 (S109).

The first brightness value is a value indicating a state of the first region 16 of the substrate 12 or the thin film before the laser L is irradiated and may be, for example, about 7 to 8 as a relatively bright brightness value.

The second brightness value is a value indicating a state of the first region 16 of the substrate 12 or the thin film after the laser L is irradiated and may be, for example, about 2 to 3 as a relatively dark brightness value due to the melted marks or the carbonized marks.

In an embodiment, the control unit 40 may determine that the performance of the laser L is normal when the difference between the first brightness value and the second brightness value is within a range of a reference value, for example, a range of 4 to 6. Therefore, the control unit 40 may output the first brightness value, the second brightness value, the difference value, the determination result, and the like as the data on the performance of the laser L through the display unit 50. The data may further include the first image and the second image.

In such an embodiment, the control unit 40 may determine that the performance of the laser L is abnormal when the difference between the first brightness value and the second brightness value is not in the range of the reference value.

In one exemplary embodiment, for example, when the difference between the first brightness value and the second brightness value is less than or greater than the reference value, the control unit 40 may determine that the performance of the laser L is degraded because the energy density or intensity of the laser L is reduced or increased.

When the energy density or intensity of the laser L is reduced, the melted marks or the carbonized marks may appear relatively bright. When the energy density or intensity of the laser L is increased, the melted marks or the carbonized marks may appear relatively dark.

The control unit 40 may provide the data on the performance of the laser L to the laser generation unit or the like. The laser generation unit may adjust an output of the laser L or an optical system in a way such that the density or intensity of the laser L is within the normal range.

In an alternative embodiment, a plurality of image acquiring units 30 may be used. In one exemplary embodiment, for example, where two image acquiring units 30 are used, it is allowed to acquire a first image for each of the first regions 16 of the substrate 12, or acquire the first image and the second image, respectively. In such an embodiment, a deviation between the image acquiring units 30 may be effectively prevented through processing of more data, and the efficiency of the process may be increased.

In an embodiment of the invention, the laser irradiation apparatus 100 may monitor the performance of the laser L in real time during a manufacturing process. In such an embodiment, a defect caused by the degradation of the performance of the laser L may be detected in real time and notified to the user so that further defects may be effectively prevented in advance.

In such an embodiment, the laser irradiation apparatus 100 acquires images before and after the irradiation of the laser L with respect to the same first region 16 and evaluates the performance of the laser L using grayscale values of the images in detail.

When inspections are performed on different regions, accuracy may be lowered due to differences in environment or conditions. However, according to an embodiment of the invention, precision and accuracy of the inspections are high because inspections are performed on a same region. Therefore, the performance of the laser L may be stably and uniformly maintained.

In an embodiment, the first region 16 has been described as a partial region including the alignment mark 14a and the identification mark 14b. This is to obtain more precise and accurate determination results by acquiring and comparing images before and after the irradiation of the laser L with respect to the same region. In an alternative embodiment, the first region 16 may be changed and modified as desired.

Figure 4:
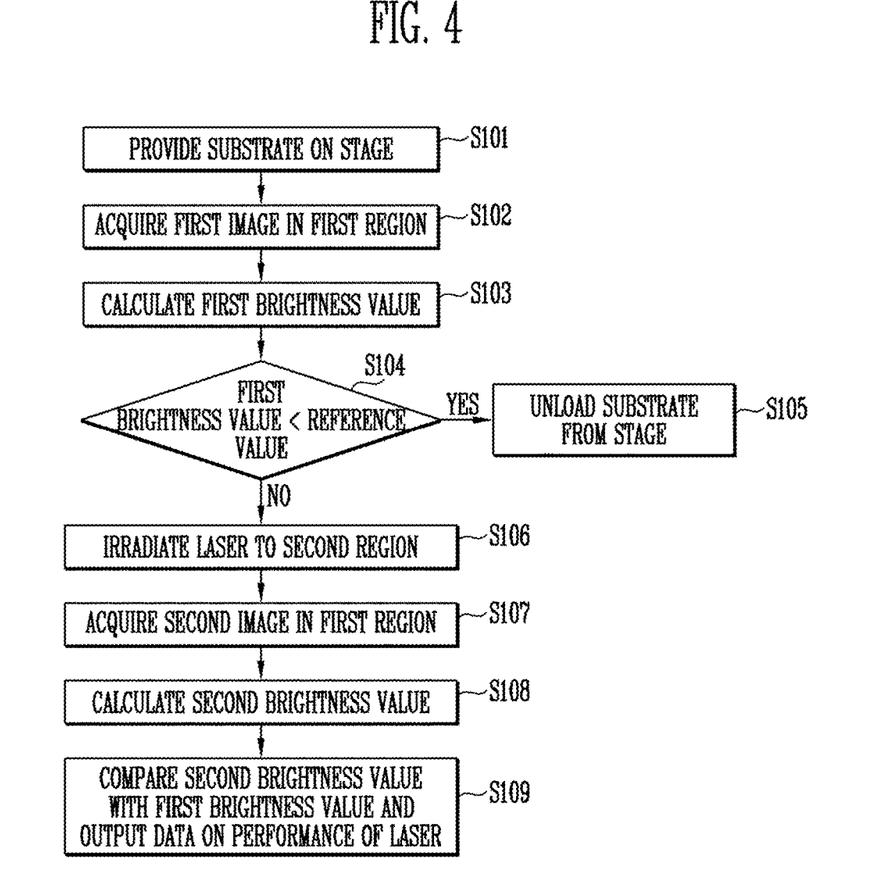
FIG. 4 is a flowchart showing a driving method of the laser irradiation apparatus according to an alternative embodiment of the invention.

FIG. 4 is a flowchart showing a driving method of the laser irradiation apparatus 100 according to an alternative embodiment of the invention.

A driving method show in FIG. 4 is substantially the same as the driving method shown in FIG. 3 except for the steps S104 and S105. Therefore, for convenience of description, any repetitive detailed description of the same or like steps will be omitted or simplified.

In an embodiment, as shown in FIG. 4, the control unit 40 may calculate the first brightness value (S103) and compare the first brightness value with the reference value (e.g., 4 to 6) (S104).

When the first brightness value is less than the reference value, the substrate 12 may be unloaded from the stage 10 (S105).

When the substrate 12 to which the laser L is irradiated is put back into the process, defects may be caused by excessive irradiation of the laser L. In addition, when the surface of the substrate 12 is contaminated with foreign matter or the like, defects may be caused.

The above steps S104 and S105 are performed before the irradiation of the laser L is performed so that the substrate 12 is not reintroduced into the process. Therefore, defects may be effectively prevented.

In such an embodiment, when the first brightness value is equal to or greater than the reference value, the remaining steps (S106 to S109) may be sequentially performed as in the embodiment described above with reference to FIG. 3.

Figure 5:
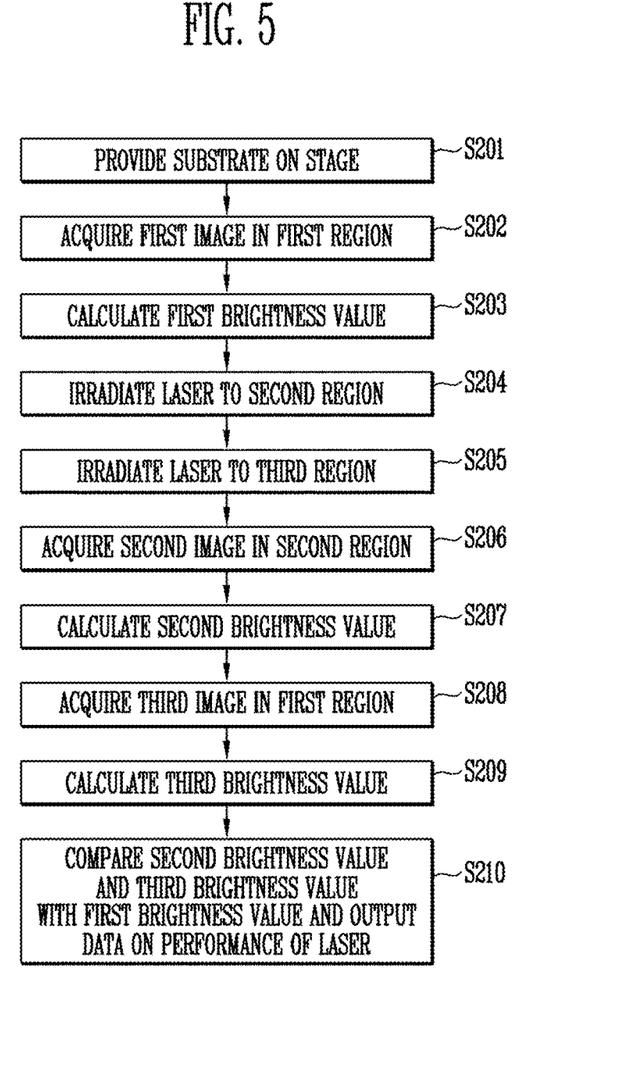
FIG. 5 is a flowchart showing a driving method of the laser irradiation apparatus according to another alternative embodiment of the invention.
Figure 6:
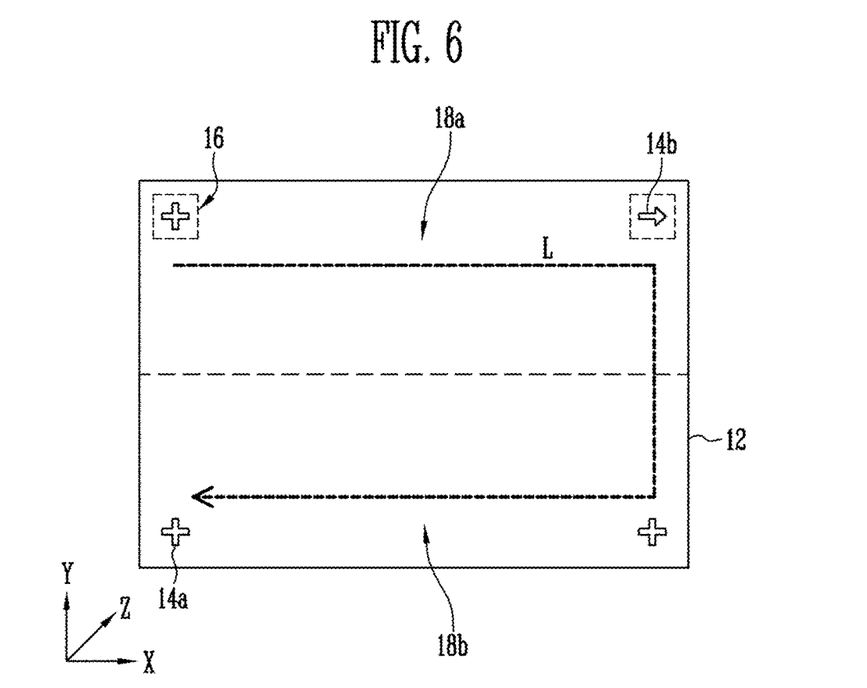
FIG. 6 is a plan view showing an exemplary of a substrate for explaining the method of FIG. 5.

FIG. 5 is a flowchart showing a driving method of the laser irradiation apparatus 100 according to another alternative embodiment of the invention. FIG. 6 is a plan view showing an exemplary embodiment of a substrate for explaining the method of FIG. 5.

First, referring to FIG. 6, the substrate 12 described above with reference to FIG. 2 may be used. However, in such an embodiment, the substrate 12 may include a second region 18a including the first region 16 and a third region 18b adjacent to the second region 18a instead of the second region 18 of FIG. 2.

Referring to FIG. 5, the substrate 12 may be provided on the stage 10 (S201). The substrate 12 may be loaded on the stage 10 by, for example, a robot arm or an operator.

The image acquiring unit 30 may move to be above the first region 16 of the substrate 12 and photograph the first region 16 of the substrate 12 to acquire a first image (S202). The image acquiring unit 30 may provide the first image to the control unit 40.

In such an embodiment, the image acquiring unit 30 may photograph the alignment mark 14a and the identification mark 14b of the substrate 12 and provide acquired images to the control unit 40 to check the alignment state of the substrate 12 before acquiring the first image.

The control unit 40 may calculate an average value of grayscale values of the first image provided from the image acquiring unit 30 and calculate a first brightness value corresponding to the average value (S203).

The first brightness value may be calculated through the processes described above with reference to FIG. 3.

The laser irradiation unit 20 may irradiate the laser L to the second region 18a of the substrate 12 including the first region 16 in a state where the image acquiring unit 30 returns to the original position (S204). The laser L may be successively irradiated onto the third region 18b of the substrate 12 adjacent to the second region 18a (S205).

In one exemplary embodiment, for example, the laser irradiation unit 20 moves along an X-axis direction from one end of the second region 18a and then moves along a Y-axis direction from the distal end of the second region 18a toward the third region 18b. Then, the laser irradiation unit 20 continuously moves along the X-axis direction from one end of the third region 18b toward the distal end of the third region 18b.

Although the second region 18a and the third region 18b are illustrated in FIG. 6, in such an embodiment, the substrate 12 may be divided into three or more regions, and the laser L may be irradiated in such a manner that the plurality of regions are sequentially scanned.

Melted marks or carbonized marks may remain on the substrate 12 or the thin film to which the laser L is irradiated.

The image acquiring unit 30 may move to be above the second region 18a of the substrate 12 and photograph the second region 18a of the substrate 12 to acquire a second image (S206). The image acquiring unit 30 may provide the second image to the control unit 40.

In an embodiment, the second region 18a may be a region including the identification mark 14b, but not being limited thereto.

The control unit 40 may calculate an average value of grayscale values of the second image provided from the image acquiring unit 30 and calculate a second brightness value corresponding to the average value (S207). The process of calculating the second brightness value may be the same as the process of calculating the first brightness value.

The image acquiring unit 30 may move to be above the first region 16 of the substrate 12 again and photograph the first region 16 of the substrate 12 to acquire a third image (S208). The image acquiring unit 30 may provide the third image to the control unit 40.

The control unit 40 may calculate an average value of grayscale values of the third image provided from the image acquiring unit 30 and calculate a third brightness value corresponding to the average value (S209). The process of calculating the third brightness value may be the same as the process of calculating the first brightness value.

The control unit 40 may compare the second brightness value and the third brightness value with the first brightness value and output data on the performance of the laser L obtained based on a result of comparing the second brightness value and the third brightness value with the first brightness value through the display unit 50 and/or the alarm 60 (S210).

The first brightness value is a value indicating a state of the first region 16 of the substrate 12 or the thin film before the laser L is irradiated and may be, for example, about 7 to 8 as a relatively bright brightness value.

The second brightness value is a value indicating a state of the second region 18a of the substrate 12 or the thin film after the laser L is irradiated and may be, for example, about 2 to 3 as a relatively dark brightness value due to the melted marks or the carbonized marks.

The third brightness value is a value indicating a state of the first region 16 of the substrate 12 or the thin film after the laser L is irradiated and may be, for example, about 2 to 3 as a relatively dark brightness value due to the melted marks or the carbonized marks.

In such an embodiment, as described above, the driving method may further include a function of detecting a change in performance of the laser L during a process of irradiating the laser L.

In an embodiment of the invention, the change in performance of the laser L before and after the irradiation of the laser L may be detected through the difference in brightness value between the first image and the third image with respect to the first region 16. In such an embodiment, the change in performance of the laser L that may occur in the process of irradiating the laser L may be detected using the brightness value of the second image of the second region 18a.

The change in performance of the laser L occurring in the process of irradiating the laser L may act as a factor for lowering the uniformity of quality such as an image stain. According to an embodiment of the driving method, the performance of the laser L in the entire region of the substrate 12 may be uniformly maintained, such that the uniformity of the quality may be increased.

Such an embodiment of the laser irradiation apparatus 100 may be used, for example, in a manufacturing process of a display device.

FIGS. 7A to 7E are cross-sectional views illustrating a method of manufacturing a display device using the laser irradiation apparatus 100 according to an embodiment of the invention.

Figure 7A:
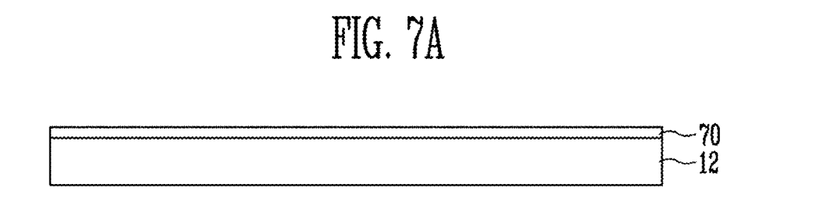
FIGS. 7A to 7E are cross-sectional views illustrating a method of manufacturing a display device using the laser irradiation apparatus according to an embodiment of the invention.

Referring to FIG. 7A, a first thin film 70 may be provided on a surface, e.g., an upper surface, of a supporting substrate 12.

The supporting substrate 12 may be a transparent substrate having heat resistance. In one exemplary embodiment, for example, the supporting substrate 12 may include or be formed of a glass substrate.

The first thin film 70 may include or be formed of an organic film, or may have a laminated structure of an organic film, an inorganic film, and an organic film.

The organic film may include or be formed of at least one material selected from polyethersulphone ("PES"), polyacrylate ("PAR"), polyether imide ("PEI"), polyethylenenaphthalate ("PEN"), polyethyleneterephthalate ("PET"), polyphenylene sulfide ("PPS"), polyallylate and polyimide ("PI"), for example, but not being limited to.

The inorganic film of the first thin film 70 may be a barrier layer and may block penetration of foreign matter, moisture or outside air from a bottom of the supporting substrate 12.

The inorganic film may include at least one selected from silicon nitride, aluminum nitride, zirconium nitride, titanium nitride, hafnium nitride, tantalum nitride, silicon oxide, aluminum oxide, titanium oxide, tin oxide, cerium oxide and silicon oxynitride.

Figure 7B:
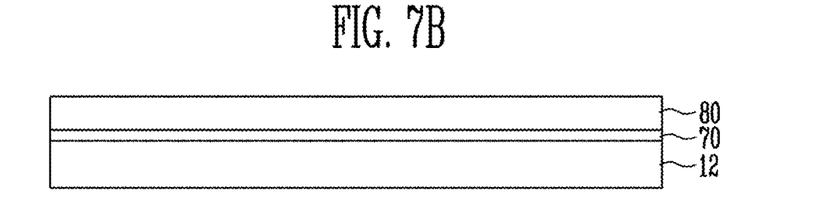

Referring to FIG. 7B, an element layer 80 may be provided on the first thin film 70.

The element layer 80 may include a pixel array for displaying an image. Each pixel of the pixel array may include a light emitting element and a pixel circuit for driving the light emitting element. The pixel circuit may include a thin film transistor and a capacitor. The light emitting element may include a liquid crystal display device or an organic light emitting diode.

Figure 7C:
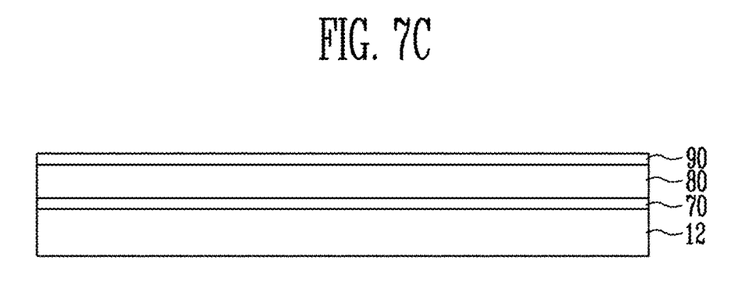

Referring to FIG. 7C, a second thin film 90 may be provided on the element layer 80.

The second thin film 90 may protect and seal the element layer 80. The second thin film 90 may include or be formed of an organic film or an inorganic film, or may have a laminated structure of an organic film and an inorganic film.

Figure 7D:
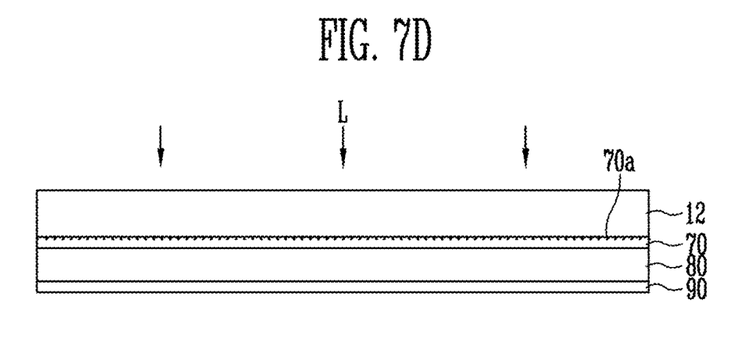

Referring to FIG. 7D, the laser L may be irradiated to another surface, e.g., a lower surface, of the supporting substrate 12. The laser L may be irradiated to the interface between the supporting substrate 12 and the first thin film 70.

The first thin film 70 may be melted and carbonized to a predetermined thickness by the laser L so that carbonized marks 70a may remain.

The laser irradiation process will hereinafter be described in greater detail with reference to FIGS. 1 to 3.

First, the supporting substrate 12 may be provided on the stage 10 (S101). At this time, the supporting substrate 12 may be provided in a way such that the another surface faces upward.

The image acquiring unit 30 may move to be above the first region 16 of the supporting substrate 12 and photograph the first region 16 of the supporting substrate 12 to acquire the first image (S102). The image acquiring unit 30 may provide the first image to the control unit 40.

In such an embodiment, the image acquiring unit 30 may photograph the alignment mark 14a and the identification mark 14b of the supporting substrate 12 and provide acquired images to the control unit 40 to check the alignment state of the supporting substrate 12 before acquiring the first image.

The control unit 40 may calculate an average value of grayscale values of the first image provided from the image acquiring unit 30 and calculate a first brightness value corresponding to the average value (S103).

The laser irradiation unit 20 may irradiate the laser L to the second region 18 of the supporting substrate 12 including the first region 16 in a state where the image acquiring unit 30 returns to the original position (S106).

The image acquiring unit 30 may move to be above the first region 16 of the supporting substrate 12 again and photograph the first region 16 of the supporting substrate 12 to acquire the second image (S107). The image acquiring unit 30 may provide the second image to the control unit 40.

The control unit 40 may calculate an average value of grayscale values of the second image provided from the image acquiring unit 30 and calculate a second brightness value corresponding to the average value (S108). The process of calculating the second brightness value may be the same as the process of calculating the first brightness value.

The control unit 40 may compare the second brightness value with the first brightness value and output data on the performance of the laser L obtained based on a result of comparing the second brightness value with the first brightness value through the display unit 50 and/or the alarm 60 (S109).

According to an embodiment of the invention, an image including carbonized marks 70a due to the irradiation of the laser L is acquired, the brightness value (the second brightness value) is calculated from the image, and the calculated brightness value is compared with the reference brightness value (the first brightness value). Therefore, the performance of the laser L during the manufacturing process may be monitored in real time through the above process.

Figure 7E:
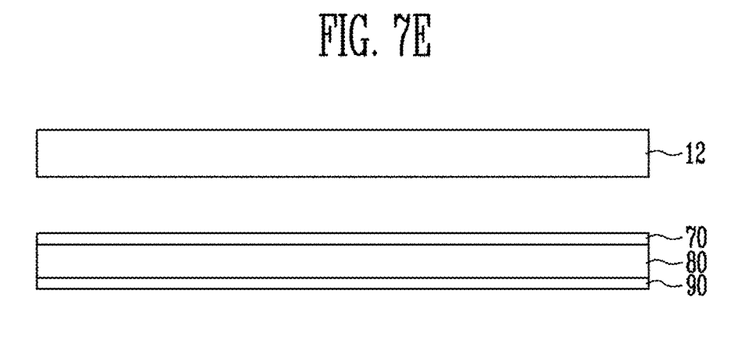

Referring to FIG. 7E, the supporting substrate 12 may be separated from the first thin film 70. The supporting substrate 12 may be easily separated due to the carbonized marks 70a.

The first thin film 70, the element layer 80, and the second thin film 90 may constitute a display panel of a liquid crystal display device or an organic light emitting display device.

When the performance of the laser L is lowered in the process of irradiating the laser L described with reference to FIG. 7D, the interface of the first thin film 70 may be poor, for example, the first thin film 70 may be torn off during separation of the supporting substrate 12 from the first thin film 70. Such defects may occur repeated during the manufacturing process.

According to an embodiment of the invention, defects caused by the degradation of the performance of the laser L may be detected in real time such that such defects may be quickly responded.

An embodiment of the laser irradiation apparatus according to the invention is configured to monitor the performance of the laser in real time during the manufacturing process such that a defect caused by the degradation of the performance of the laser may be detected in real time and the user may be notified of the defect to allow to prevent further defects from occurring in advance.

In such an embodiment, the laser irradiation apparatus acquires images before and after the laser irradiation on the same region and evaluates the performance of the laser using grayscale values of the images in detail. Therefore, precision and accuracy of the inspection may be high.

Accordingly, in such an embodiment, the performance of the laser can be stably and uniformly maintained. In an embodiment, where a plurality of image acquiring units are used, a deviation between the image acquiring units may be quickly and easily prevented through processing of data, and the efficiency of the process can be increased.

As described above, some embodiments of the invention have been disclosed through the detailed description and the drawings. It is to be understood that the terminology used herein is for the purpose of describing the invention only and is not used to limit the scope of the invention described in the claims. Therefore, those skilled in the art will appreciate that various modifications and equivalent embodiments are possible without departing from the scope of the invention. Accordingly, the scope of the invention should be determined by the technical idea of the appended claims.

What is claimed is:

1. A laser irradiation apparatus comprising:
   a stage on which a substrate is provided;
   a laser irradiation unit which irradiates a laser to the substrate on the stage;
   an image acquiring unit which acquires an image of a predetermined region of the substrate; and
   a control unit electrically connected to the laser irradiation unit and the image acquiring unit,
   wherein the control unit calculates a brightness value corresponding to an average value of grayscale values of the image provided from the image acquiring unit, compares a calculated brightness value with a reference brightness value, and outputs data on performance of the laser obtained based on a result of comparing the calculated brightness value with the reference brightness value.

2. The laser irradiation apparatus of claim 1, wherein the image acquiring unit includes at least one of a charge-coupled device and a complementary metal-oxide semiconductor.

3. The laser irradiation apparatus of claim 1, wherein
the reference brightness value is calculated from grayscale values of an image acquired by the image acquiring unit before irradiating the laser to the substrate, and
the image for calculating the reference brightness value is acquired in the predetermined region of the substrate.

4. The laser irradiation apparatus of claim 1, wherein the calculated brightness value is calculated from the grayscale values of the image acquired by the image acquiring unit after irradiating the laser to the substrate.

5. The laser irradiation apparatus of claim 1, wherein the predetermined region of the substrate includes one of an alignment mark and an identification mark.

6. A driving method of a laser irradiation apparatus, the driving method comprising:
providing a substrate on a stage of the laser irradiation apparatus;
acquiring a first image in a first region of the substrate;
calculating a first brightness value corresponding to an average value of grayscale values of the first image;
irradiating a laser to a second region of the substrate including the first region;
acquiring a second image in the first region of the substrate;
calculating a second brightness value corresponding to an average value of grayscale values of the second image; and
comparing the second brightness value with the first brightness value and outputting data on performance of the laser obtained based on a result of the comparing.

7. The driving method of claim 6, further comprising:
comparing the first brightness value with a reference value after calculating the first brightness value, and unloading the substrate from the stage when the first brightness value is less than the reference value.

8. The driving method of claim 6, wherein the first region of the substrate includes one of an alignment mark and an identification mark.

9. A driving method of a laser irradiation apparatus, the driving method comprising:
providing a substrate on a stage of the laser irradiation apparatus;
acquiring a first image of a first region of the substrate;
calculating a first brightness value corresponding to an average value of grayscale values of the first image;
irradiating a laser to a second region of the substrate including the first region;
irradiating a laser to a third region of the substrate adjacent to the second region;
acquiring a second image of the second region of the substrate;
calculating a second brightness value corresponding to an average value of grayscale values of the second image;
acquiring a third image of the first region of the substrate;
calculating a third brightness value corresponding to an average value of grayscale values of the third image; and
comparing each of the second brightness value and the third brightness value with the first brightness value and outputting data on performance of the laser obtained based on a result of the comparing.

10. The driving method of claim 9, wherein the first region of the substrate includes an alignment mark.

11. The driving method of claim 9, wherein the second image is acquired in the second region of the substrate including an identification mark.

12. A method of manufacturing a display device, the method comprising:
providing a first thin film on a supporting substrate;
providing an element layer on the first thin film;
providing a second thin film on the element layer; and
separating the supporting substrate from the first thin film,
wherein the separating the supporting substrate comprises:
acquiring a first image in a first region of the supporting substrate;
calculating a first brightness value corresponding to an average value of grayscale values of the first image;
irradiating a laser to a second region of the supporting substrate including the first region;
acquiring a second image in the first region of the supporting substrate;
calculating a second brightness value corresponding to an average value of grayscale values of the second image; and
comparing the second brightness value with the first brightness value and outputting data on performance of the laser obtained based on a result of the comparing.

13. The method of claim 12, wherein the first region of the supporting substrate includes one of an alignment mark and an identification mark.

* * * * *